UNITED STATES PATENT OFFICE.

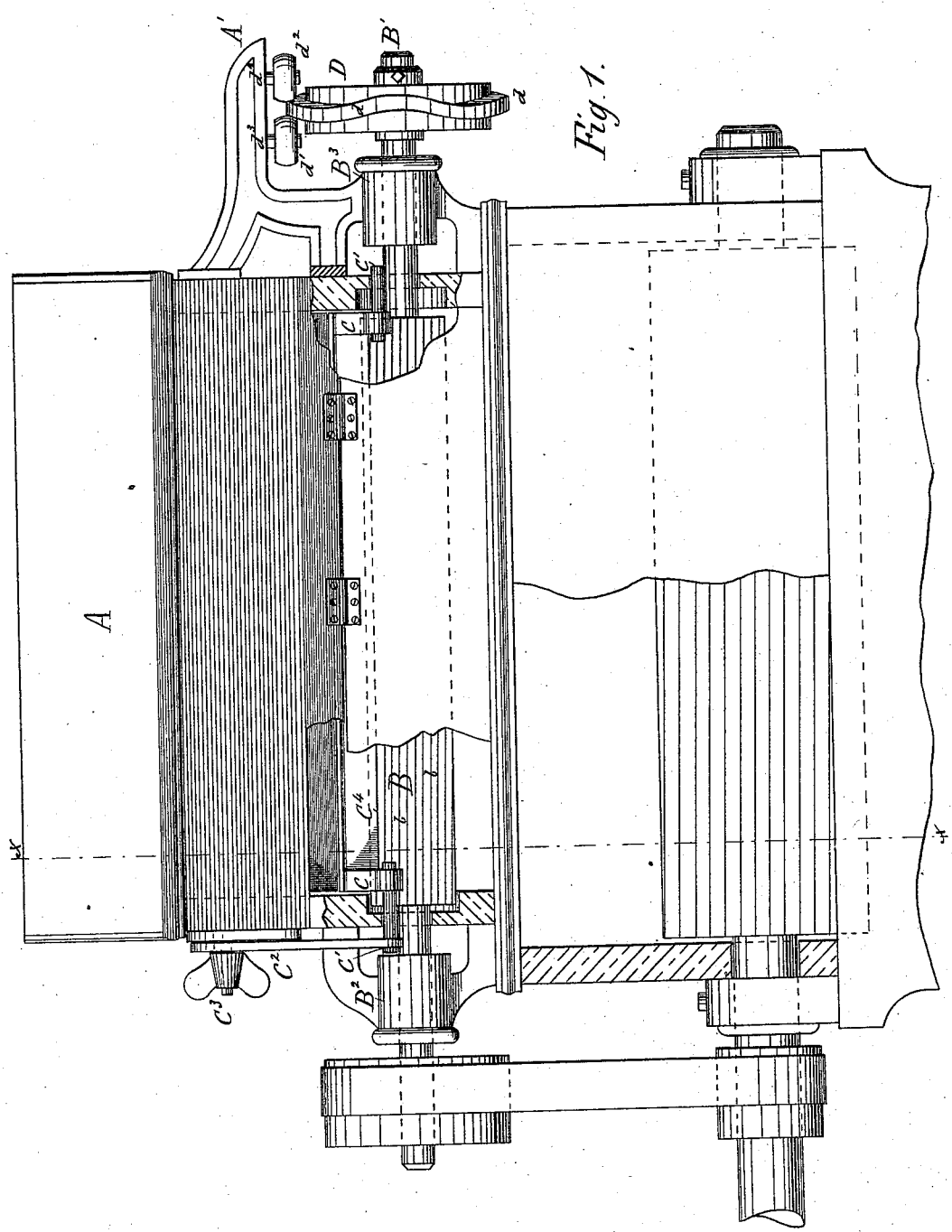

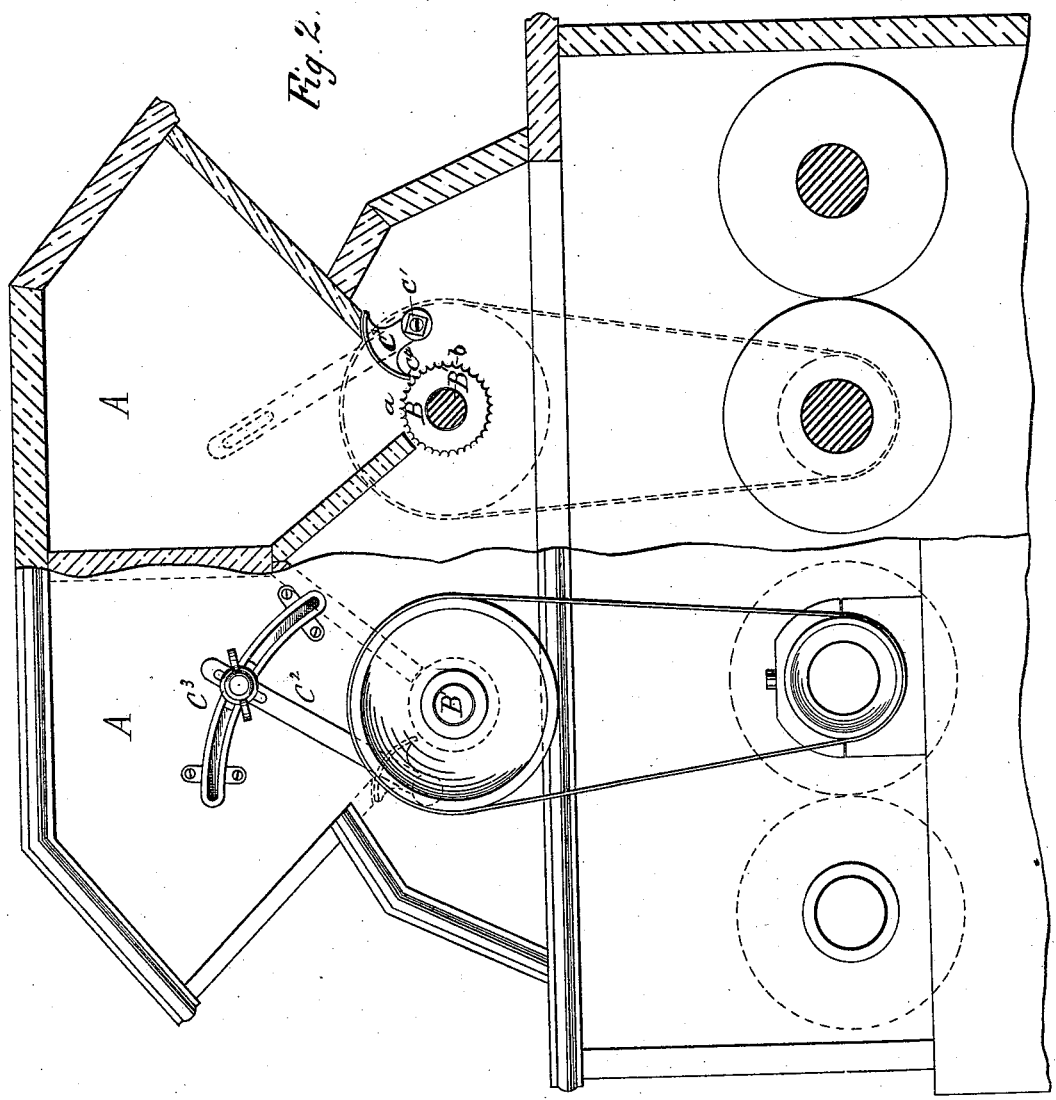

GEORGE V. HECKER, OF NEW YORK, N. Y.

FEED MECHANISM FOR ROLLER-MILLS.

SPECIFICATION forming part of Letters Patent No. 287,126, dated October 23, 1883.

Application filed August 2, 1883. (No model.)

*To all whom it may concern:*

Be it known that I, GEORGE V. HECKER, of New York, State of New York, have invented a certain Improvement in Feed Mechanisms for Roller-Mills, of which the following is a specification.

My invention relates to that class of feeding mechanism for grinding-rollers by which granular materials which have been deposited in a hopper are discharged therefrom through a narrow slot at the bottom in a thin sheet, which falls into the space between the adjoining sides of the grinding-rollers.

It has been common to provide means for varying the width of the discharge-slot in the bottom of the hopper.

My invention consists in the combination of the hopper, provided with an adjustable gate for varying the width of the discharge-opening of the hopper, with a cylinder and means for imparting to the same an endwise-reciprocating motion, and also rotation in such direction that its upper surface moves toward the adjustable gate, which constitutes one longitudinal side of the discharge-opening, while the surface of the cylinder constitutes the other longitudinal side of the discharge-opening. The compound motion thus imparted to the cylinder insures the equal distribution of the granular material and its discharge through the space between the gate and the cylinder in a sheet of uniform thickness.

The accompanying drawings representing a double hopper provided with my improved discharging apparatus are as follows:

Figure 1 is a front elevation, with portions of the front of the apparatus shown as broken away. Fig. 2 is an end elevation, partly in section through the line X X on Fig. 1.

The drawings represent the usual double hopper surmounting two prismoidally-shaped chambers, each provided with the devices for effecting the even delivery of the material to be ground to the pairs of grinding-rollers arranged, respectively, beneath the chambers. Each chamber A of the double hopper has inwardly-inclined sides, with an opening, $a$, at the bottom, which is partially closed by the surface of one of the distributing-cylinders B. The lower portion of the outer wall of each chamber is provided with the usual adjustable gate, C, affixed to the rock-shaft C', provided with the slotted radius-bar $C^2$ and binding-screw $C^3$, by means of which the lower edge, $C^4$, of the gate is capable of being adjusted and fastened at variable distances from the surface of the distributing-cylinder. The distributing-cylinders are represented in the drawings as having formed on their peripheries the parallel grooves $b$, extending longitudinally from one end of the cylinder to the other. These grooves may, however, be formed spirally around the cylinder, if desired. In order to agitate the lower stratum of the material in the hopper and prevent it from packing, and also in order to insure its discharge in a sheet of uniform thickness, I impart to each distributing-cylinder an endwise reciprocating movement, by which the cylinder is made to act as an evener as well as an agitator. The cylinder B for each chamber is fixed upon a shaft, B', supported in bearings $B^2$ and $B^3$, and capable of endwise movement therein. At one end of each shaft B' there is affixed a cam-wheel, D, provided upon its periphery with the sinuously-curved rib $d$. The endwise movement of each cylinder is effected by means of the stationary rollers $d'$ and $d^2$, mounted, respectively, upon vertical pivots $d^3$ and $d^4$, affixed to the horizontal projection A' of the frame of the machine. It will be seen that each distributing-cylinder in rotating is made to move longitudinally from right to left and from left to right, as the sinuosities of the rib $d$ travel between the stationary rollers $d'$ and $d^2$.

It will of course be understood that, if desired, single hoppers may be used instead of a double hopper, in which case only one discharge-outlet will be employed, and either of the chambers A may be regarded as the hopper.

It will also be seen that the hopper need not be of the proportional dimensions indicated in the drawings, nor necessarily be in close proximity to the distributing mechanism, as the equalizing effect would also be produced upon a stream of grain fed to the distributing mechanism from a spout or chute, in which case the adjustable gate and the adjoining upper surface of the cylinder would constitute the front and rear boundaries of a shallow hopper, and the space between them the discharge-opening.

I claim as my invention—

1. In combination with a hopper for receiving granular materials, a distributing-cylinder extending longitudinally across the discharge-opening of the hopper, and means for imparting to such cylinder an endwise-reciprocating movement, and also a rotatory movement upon its own axis, substantially as and for the purposes set forth.

2. A hopper for receiving granular materials, and a distributing-cylinder extending longitudinally across the discharge-opening of the hopper, and means for imparting to such cylinder an endwise-reciprocating movement, and also a rotatory movement upon its own axis, in combination with an adjustable gate for regulating the width of such discharge-opening, substantially as shown and described.

GEO. V. HECKER.

Witnesses:
HENRY E. DUNCAN,
EDWD. P. SLEIN.